United States Patent
Bergeron Gull et al.

(10) Patent No.: US 6,189,842 B1
(45) Date of Patent: Feb. 20, 2001

(54) TILT AND SWIVEL ADJUSTMENT OF FLAT PANEL DISPLAY HAVING DETENTS FOR LANDSCAPE AND PORTRAIT POSITIONS AND KICKOUT FOR PREVENTING CONTACT BETWEEN FLAT PANEL DISPLAY AND BASE

(75) Inventors: Kathleen A. Bergeron Gull, San Jose; Gregory Allen Springer, Sunnyvale; Malcolm Sloan Smith, Palo Alto, all of CA (US)

(73) Assignee: Palo Alto Design Group, Palo Alto, CA (US)

( * ) Notice: Under 35 U.S.C. 154(b), the term of this patent shall be extended for 0 days.

(21) Appl. No.: 09/336,918

(22) Filed: Jun. 21, 1999

(51) Int. Cl.[7] .................................................. A47F 5/00
(52) U.S. Cl. ................... 248/125.1; 248/278; 248/283.1; 248/919
(58) Field of Search .............................. 248/125.1, 278.1, 248/279.1, 283.1, 917, 919, 920, 921, 922

(56) References Cited

U.S. PATENT DOCUMENTS

| | | | | |
|---|---|---|---|---|
| 5,687,939 | * | 11/1997 | Moscovitch | 248/921 X |
| 5,924,665 | * | 7/1999 | Sweere et al. | 248/278.1 X |
| 6,095,467 | * | 8/2000 | Neuhof | 248/278.1 |

* cited by examiner

*Primary Examiner*—Ramon O. Ramirez
(74) *Attorney, Agent, or Firm*—Haverstock &Owens LLP

(57) ABSTRACT

Tilt and swivel adjustment of a flat panel display including detents for landscape and portrait positions and a kickout feature for preventing contact between the flat panel display and its base. A stand for the display includes a neck member coupled to the base member and a riser member which is slidable with respect to the neck member. The display is mounted to an upper portion of the riser member via a swivel apparatus which allows a user to pivot the display between landscape and portrait orientations. The swivel apparatus includes a cam and corresponding ramp. When the display is pivoted between the portrait and landscape orientations, the cam and ramp cause the display to be tilted with respect to the stand such that a lower portion of the display is tilted away from the base member, thereby preventing contact therebetween. The swivel apparatus includes a bearing member which is mounted between the display and a portion of the swivel apparatus which is pivotable with respect to the display. The bearing member includes a bearing surface providing a wear-resistant and smooth frictional pivot coupling. The bearing member also includes one or more integrally formed projections, each of which mates with a first corresponding receptacle when the display is in the portrait orientation and with a second corresponding receptacle when the display is the landscape orientation. Thus, the bearing member provides both a bearing surface and detents.

41 Claims, 11 Drawing Sheets

TILT AND SWIVEL ADJUSTMENT OF FLAT PANEL DISPLAY HAVING DETENTS FOR LANDSCAPE AND PORTRAIT POSITIONS AND KICKOUT FOR PREVENTING CONTACT BETWEEN FLAT PANEL DISPLAY AND BASE

FIELD OF THE INVENTION

The present invention relates to the field of flat panel displays. More particularly, the present invention relates to the field of tilt and swivel positioning adjustment of a flat panel display.

BACKGROUND OF THE INVENTION

In a conventional display having a cathode ray tube (CRT), the CRT occupies a significant amount of space behind the viewable area of the display screen. In addition, the CRT is formed of a quantity of glass and requires electromagnetic elements for directing an electron beam from behind the display area of the CRT. Accordingly, CRT displays tend to be bulky and heavy. As a result, CRT displays for use as computer monitors are typically mounted to a stand which provides only limited ability to adjust to the position of the CRT display.

Because flat panel displays do not require a CRT, they tend to occupy less space and tend to be lighter than conventional CRT displays having comparably sized viewable areas. Accordingly, an opportunity exists for mounting flat panel displays so as to provide a greater degree of adjustability in the positioning of the viewable display area in comparison to CRT displays. A flat panel display typically provides a rectangular display area having a width unequal to its height. For example, the height of the display can be greater than its width (portrait orientation). Alternately, the width can be made greater than the height by simply rotating the flat panel display by ninety degrees (landscape orientation). Software algorithms for forming the image can be configured to appropriately orient an image displayed by the flat panel display.

Although rotating the flat panel display between portrait and landscape orientations can be effected by simply pivoting the display, problems can occur. A first problem is that when a flat panel display is rotated between the landscape and portrait orientations, insufficient clearance between the display and other objects can result in contact between the display panel and the objects, possibly damaging the flat panel display. A second problem occurs when the display is not oriented precisely in either the portrait orientation or the landscape orientation. In which case, the flat panel display, and the image displayed, may both be slightly askew from the viewpoint of a user.

What is needed is a method and apparatus for positional adjustment of a flat panel display which does not suffer from the aforementioned drawbacks.

SUMMARY OF THE INVENTION

The invention provides for tilt and swivel adjustment of a flat panel display including detents for landscape and portrait positions and a kickout feature for preventing contact between the flat panel display and its base. A stand for the flat panel display includes an elongated neck member coupled to the base member. The base member rests upon a horizontal surface, such as that of a table or desk, upon which the stand is placed. A lower portion of a riser member fits within a receptacle of the neck member and is slidable therein in a direction which is substantially perpendicular to the surface. Accordingly, to position the flat panel display higher or lower with respect to the surface, the riser member is extended or contracted with respect to the neck member.

The flat panel display is mounted to an upper portion of the riser member via a swivel apparatus. The swivel apparatus allows a user to pivot the flat panel display between horizontal (landscape) and vertical (portrait) orientations; to adjust the tilt of the flat panel display so as to move the top or bottom of the display closer to or further from the user; and to pivot the flat panel display from side-to-side about an axis which is substantially perpendicular to the surface.

In accordance with an aspect of the invention, the swivel apparatus includes a cam and a corresponding ramp member. The cam is preferably fixed with respect to the flat panel display while the ramp member is coupled to a portion of the swivel apparatus which is pivotable with respect to the display. When the flat panel display is oriented in either the portrait or landscape positions, the cam does not contact the ramp and, thus, does not interfere with tilt adjustment of the flat panel display. However, when the flat panel display is pivoted from the portrait orientation to the landscape orientation, or when the flat panel display is pivoted from the landscape orientation to the portrait orientation, the cam and corresponding ramp cause the flat panel display to be tilted with respect to the stand such that a lower portion of the flat panel display is tilted away (kicked out) from the base member (toward the user). This tilt effected by the cam and ramp members prevents contact between the flat panel display and the base member, thereby preventing damage to either caused by such contact.

In accordance with a further aspect of the invention, the swivel apparatus includes a bearing member. The bearing member is mounted between the flat panel display and the portion of the swivel apparatus which is pivotable with respect to the flat panel display for providing adjustment between the portrait and landscape orientations. The bearing member includes a bearing surface which is slidable with respect to the pivotable portion of the swivel apparatus for providing a wear-resistant and smooth frictional pivot coupling. In addition, the bearing member includes one or more projections, each of which mates with a first corresponding receptacle when the flat panel display is in the portrait orientation and each of which mates with a second corresponding receptacle when the flat panel display is the landscape orientation. Preferably, the projections are integral to the bearing member. Thus, the bearing member provides both a bearing surface and detents for assisting a user in precisely aligning the flat panel display to the portrait and landscape positions.

DETAILED DESCRIPTION OF A PREFERRED EMBODIMENT

Figure 1:
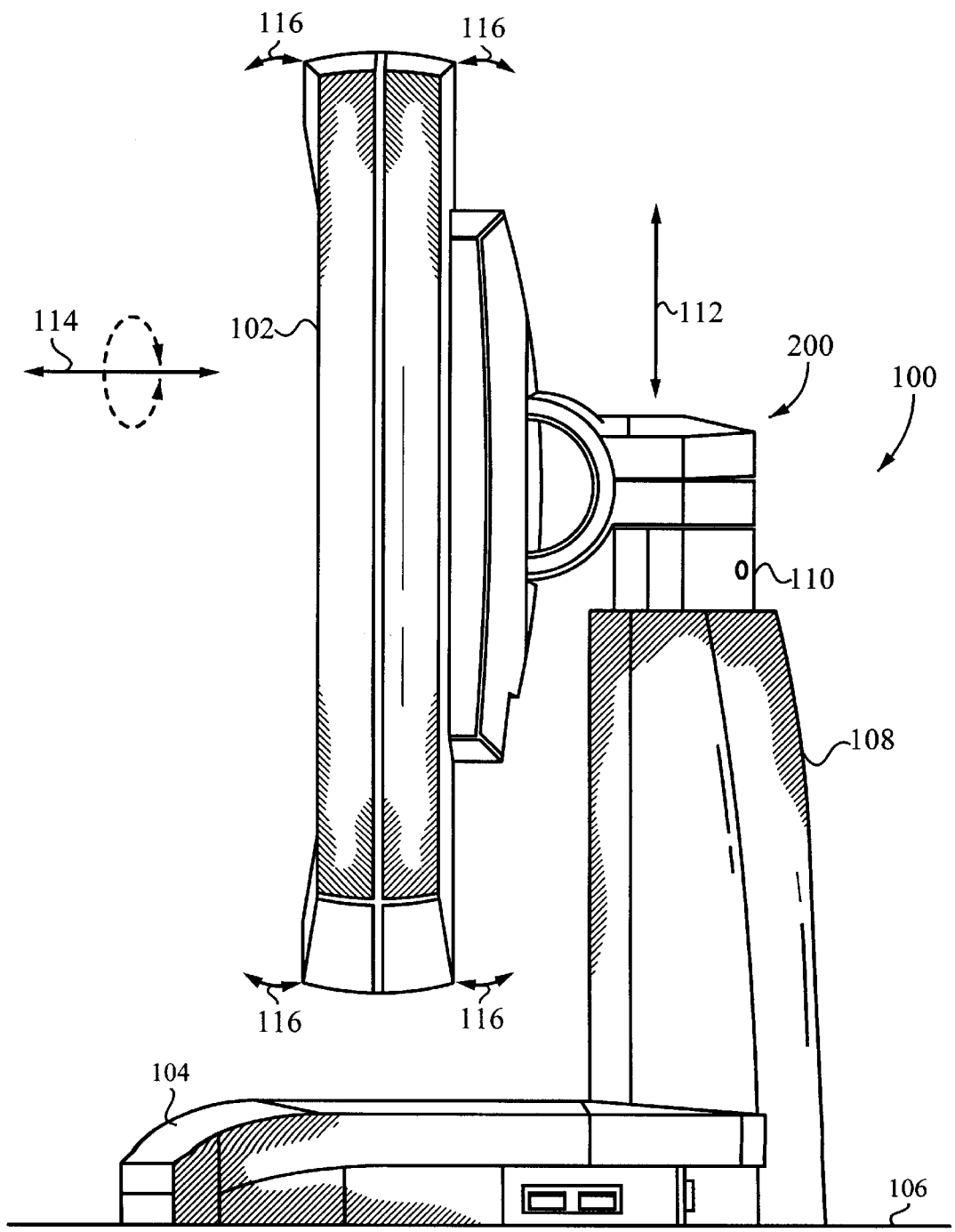
FIG. 1 illustrates a side view of a flat panel display stand for providing tilt, swivel and height adjustment for a flat panel display in accordance with the present invention.

FIG. 1 illustrates a side view of a flat panel display stand 100 for providing tilt, swivel and height adjustment for a flat panel display 102 in accordance with the present invention. As illustrated in FIG. 1, the stand 100 includes a base member 104 for resting the stand 100 on a horizontal surface 106, such as that of a table or a desk. The base member 104 is coupled to an elongated neck member 108. Preferably, a hollow cavity within the neck member 108 forms a receptacle for a riser member 110. A lower portion of the riser member 110 is slidably movable within a receptacle of the neck member 108 in a direction (shown by the double-headed arrow 112) that is substantially perpendicular to the surface 106, though it will be apparent that an angle other than perpendicular with respect to the surface 106 can be selected. Accordingly, the display 102 can be adjusted higher by extending the riser member 110 from the neck member 108 and lower by contracting the riser member 110 into the neck member 108.

Figure 7:
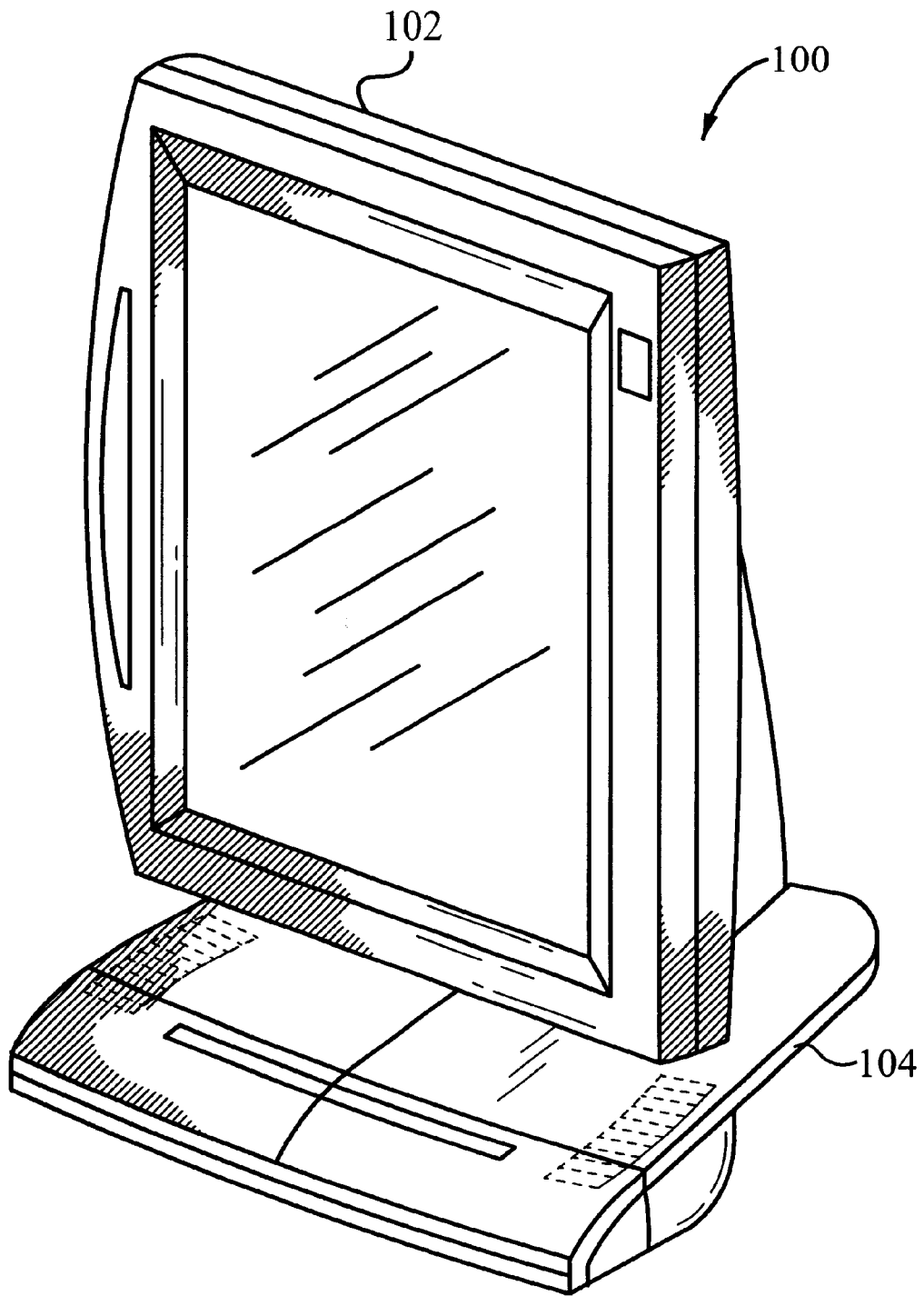
FIG. 7 illustrates a front perspective view of the flat panel display stand in accordance with the present invention where the flat panel display is oriented vertically.

The flat panel display 102 is coupled to an upper end of the riser member 110 by a tilt and swivel apparatus 200 (also shown in FIGS. 2a, 2b, and 2c) disposed between the upper end of the riser member 110 and the flat panel display 102. A first axis of rotation provided by the swivel apparatus 200 is parallel to the direction 112 for allowing the flat panel display 102 to be rotated from side-to-side. In addition, the swivel apparatus 200 preferably provides a second axis of rotation 114 which is substantially perpendicular to a viewable surface 106 of the display 102 (e.g., the axis of rotation 114 for the swivel 200 is parallel to the surface 106 when the display 102 is oriented as shown in FIGS. 3 and 7) for pivoting the display 102 between a vertical position (portrait) and a horizontal position (landscape). In addition, the swivel 200 preferably provides a third axis of rotation which is parallel to the surface 106 and perpendicular to the axis 114 for tilting the display 102 such that relative distances between the top and bottom of the display 102 and a user of the display 102 can be adjusted, as shown by the double-headed arrows 116.

Figure 2A:
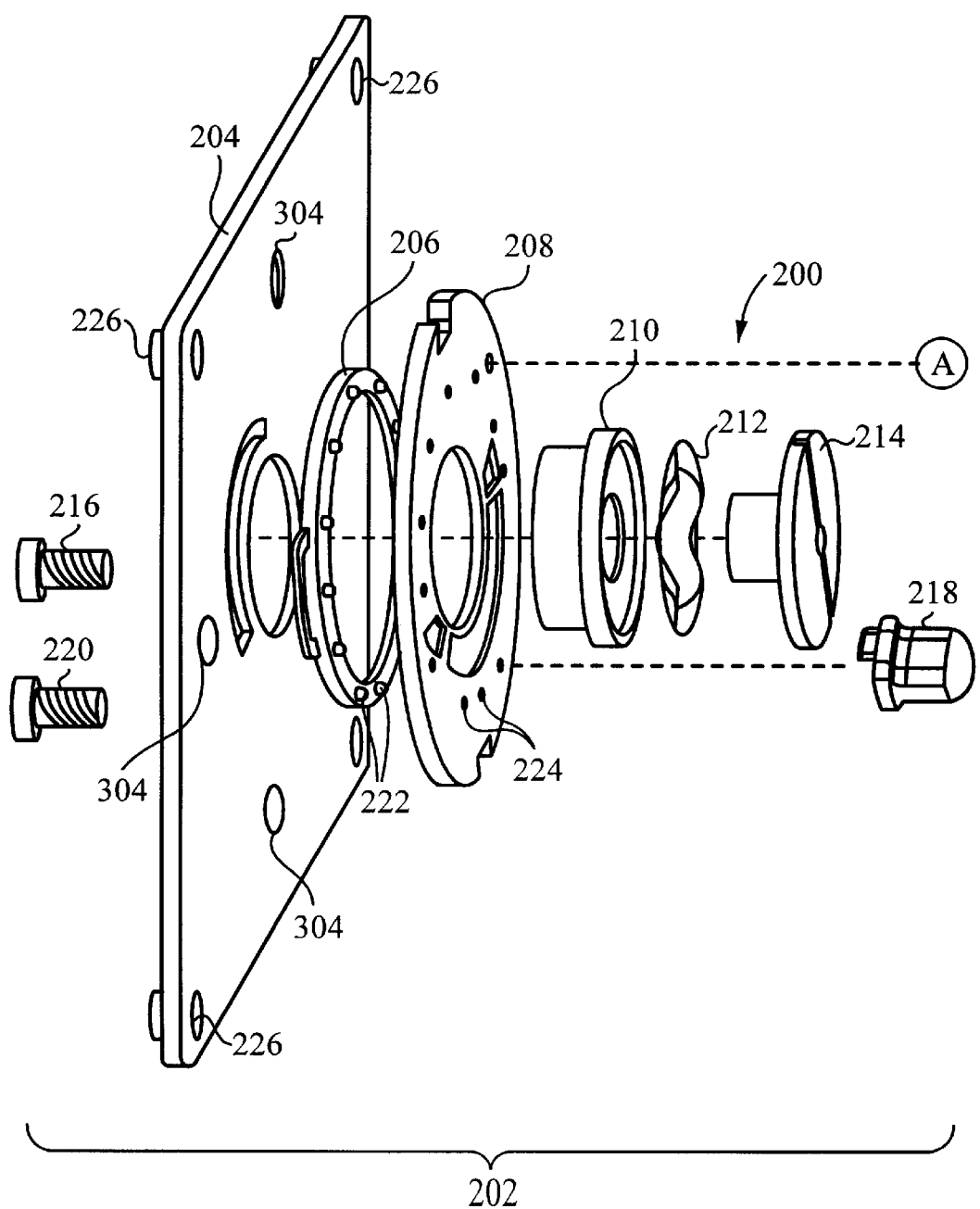
FIG. 2a illustrates an exploded view of a tilt and swivel apparatus for providing tilt and swivel adjustment of the flat panel display in accordance with the present invention.
Figure 2B:
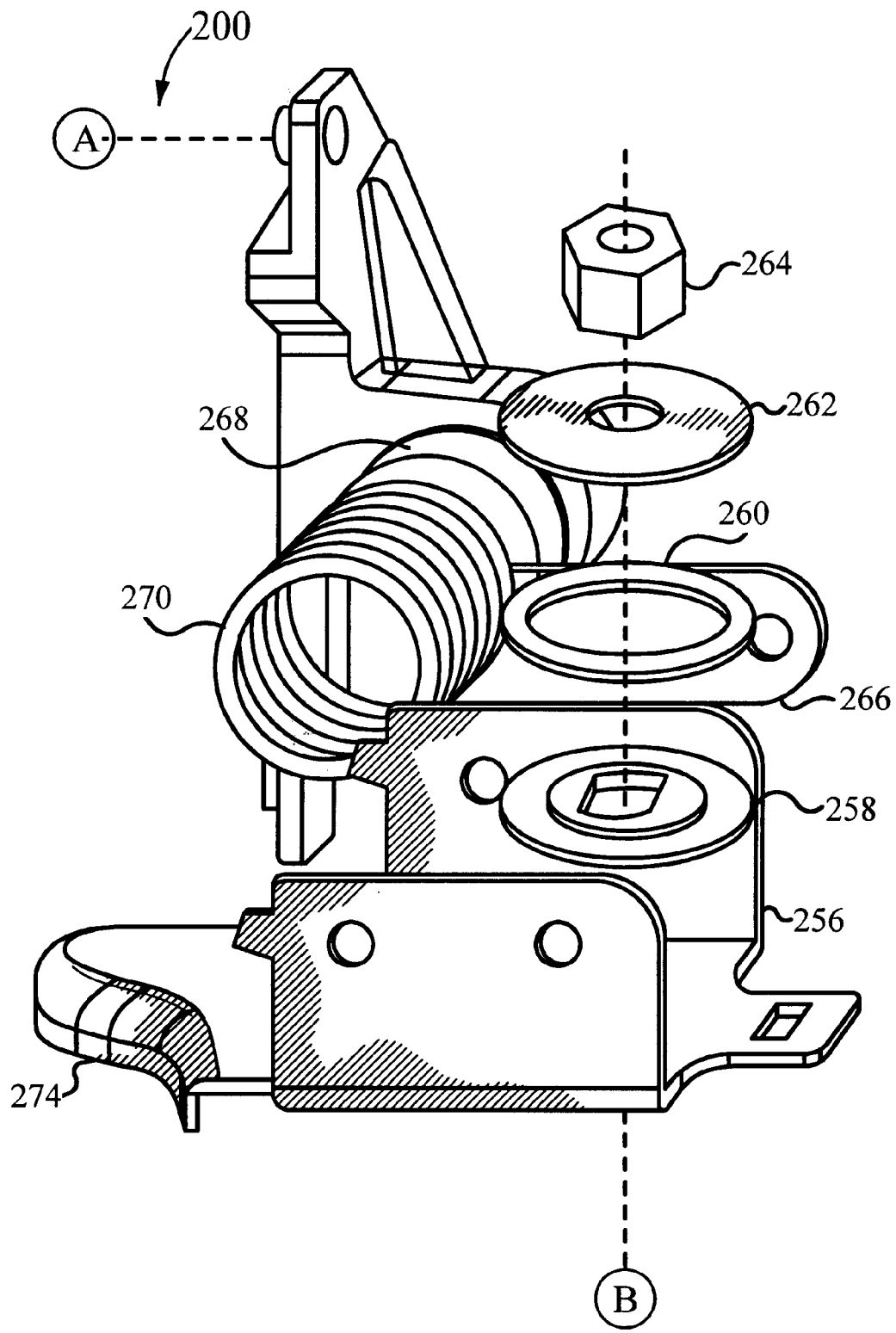
FIG. 2b illustrates a partial view of the hinge bracket member in the tilt and swivel apparatus in accordance with the present invention.
Figure 3:
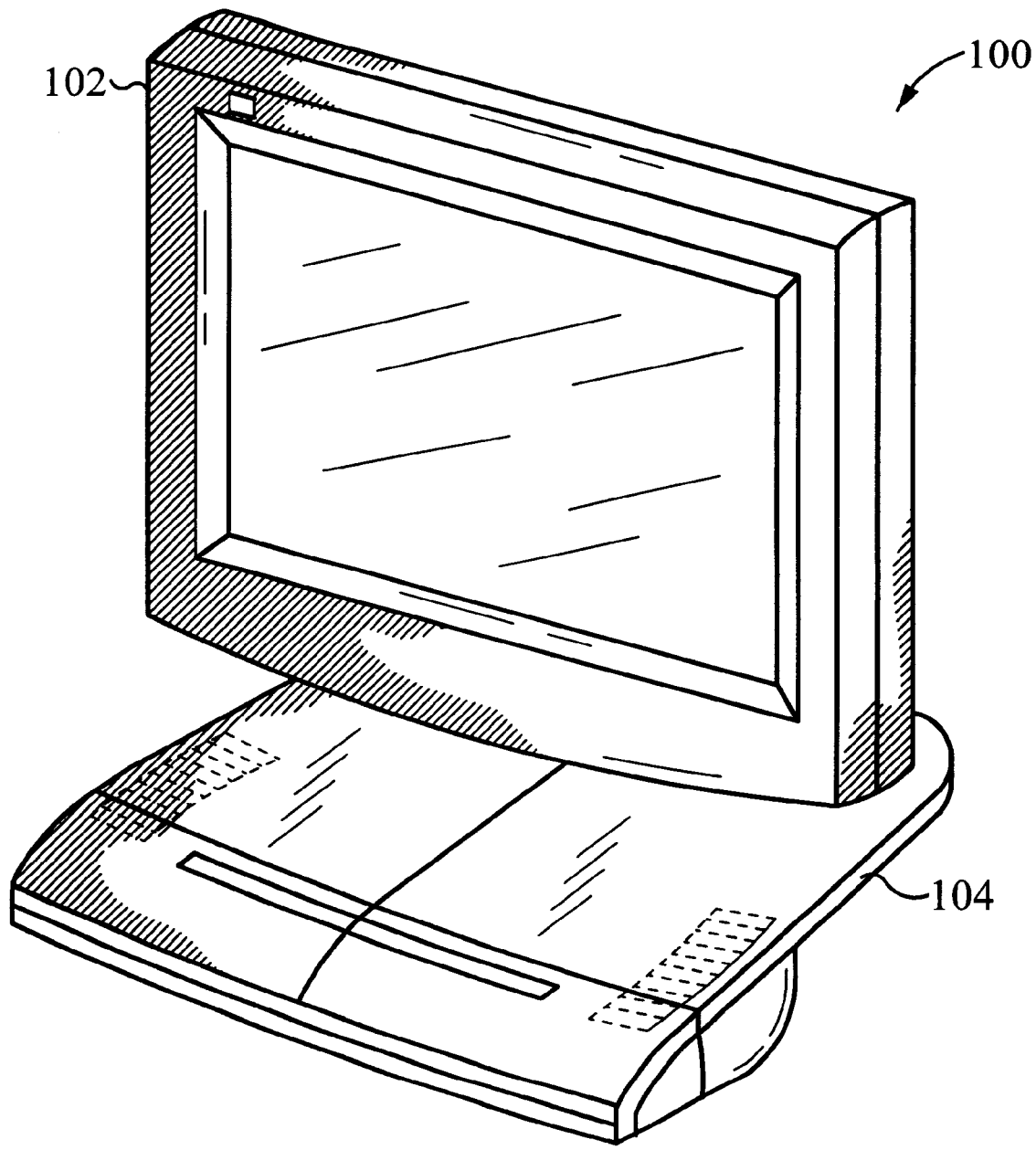
FIG. 3 illustrates a front perspective view of the flat panel display stand in accordance with the present invention where the flat panel display is oriented horizontally.

FIGS. 2a and 2b illustrate exploded views of the tilt and swivel apparatus 200 for providing tilt and swivel adjustment of the flat panel display 102 (FIG. 1) in accordance with the present invention. A pivot assembly 202 includes a first pivot plate member 204, a pivot bearing member 206, a second pivot plate member 208, a pivot bushing 210, a washer 212, a shoulder screw 214, a screw 216, a pivot cam member 218 and a screw 220. The screw 216 engages a threaded aperture of the shoulder screw 214, thereby sandwiching the pivot plate 204, the pivot bearing 206, the plate 208, the shoulder bearing 210 and the washer 212 therebetween. As a result, the pivot plates 204 and 208 are pivotable with respect to each other. Preferably, the pivot bearing 206 is maintained in a fixed position with respect to the second pivot plate 208 by the pivot bearing including a plurality of projections 222 which mate with corresponding apertures 224 in the plate 208. The pivot bearing 206 preferably includes a bearing surface which is in contact with, and slidable with respect to, the pivot plate 204 for providing a wear-resistant and smooth frictional pivot coupling between the plates 204 and 208. The screw 220 engages a threaded aperture in the cam member 218 for mounting the cam member 218 to the pivot plate 220.

The pivot plate 204 provides a mount for the flat panel display 102. The display 102 can be mounted to the pivot plate 204, as shown in FIG. 4, utilizing apertures 226 and screws (not shown).

Figure 2C:
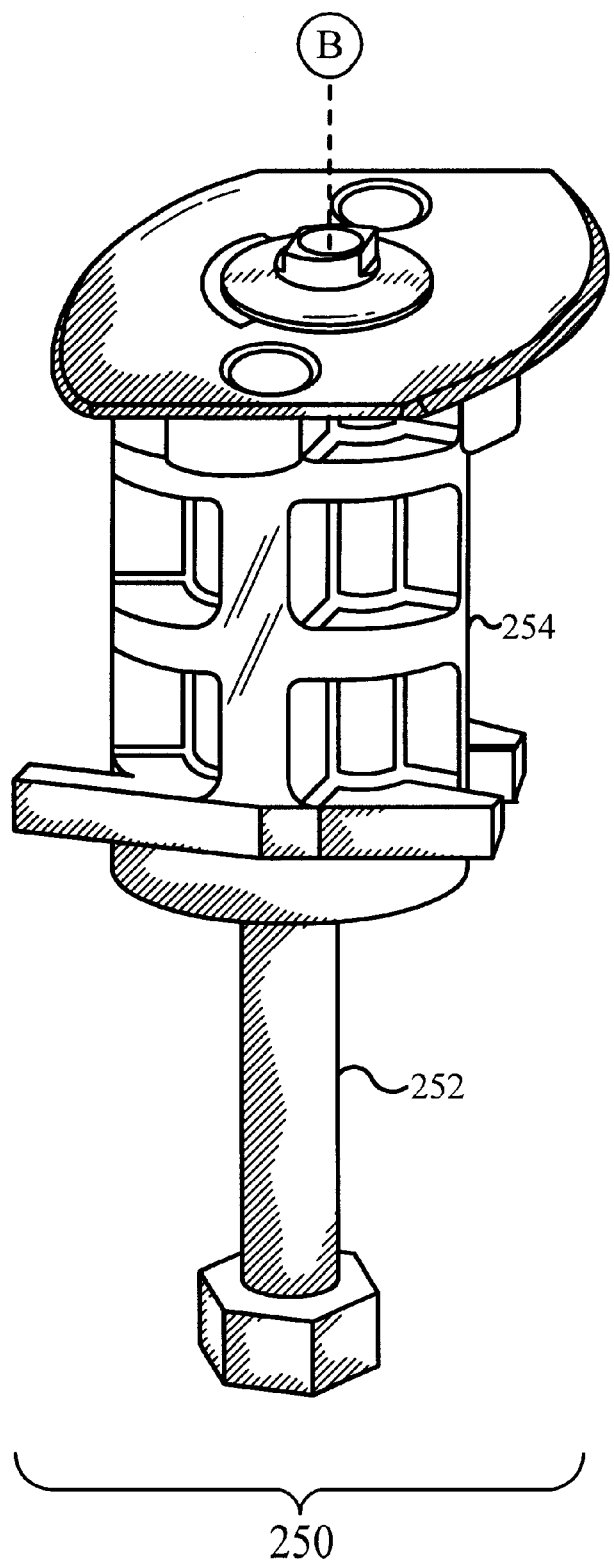
FIG. 2c illustrates a front perspective view of the hinge assembly in the tilt and swivel apparatus in accordance with the present invention.

The swivel apparatus 200 also includes a hinge assembly 250, as shown in FIG. 2c, having a bolt 252, a column member 254, a hinge bracket member 256, a bearing 258, washers 260, 262, a nut 264, and a tilt apparatus including a tilt bracket member 266, an axle 268, a spring 270 and a tilt base 272. The hinge bracket member 256 includes an extended ramp portion 274. The bolt 252 engages the nut 264 thereby sandwiching the column 254, the bracket 256, and the washers 258, 260, 262 therebetween. The hinge bracket 256 is preferably rotatable with respect to the column member 254 for rotating the display 102 (FIG. 1) from side-to-side. The column member 254 is preferably coupled to the riser member 110 (FIG. 1) such that the bracket member 256 is rotatable with respect to the riser member 110 by the bearing 258 sliding against the washer 260.

Figure 4:
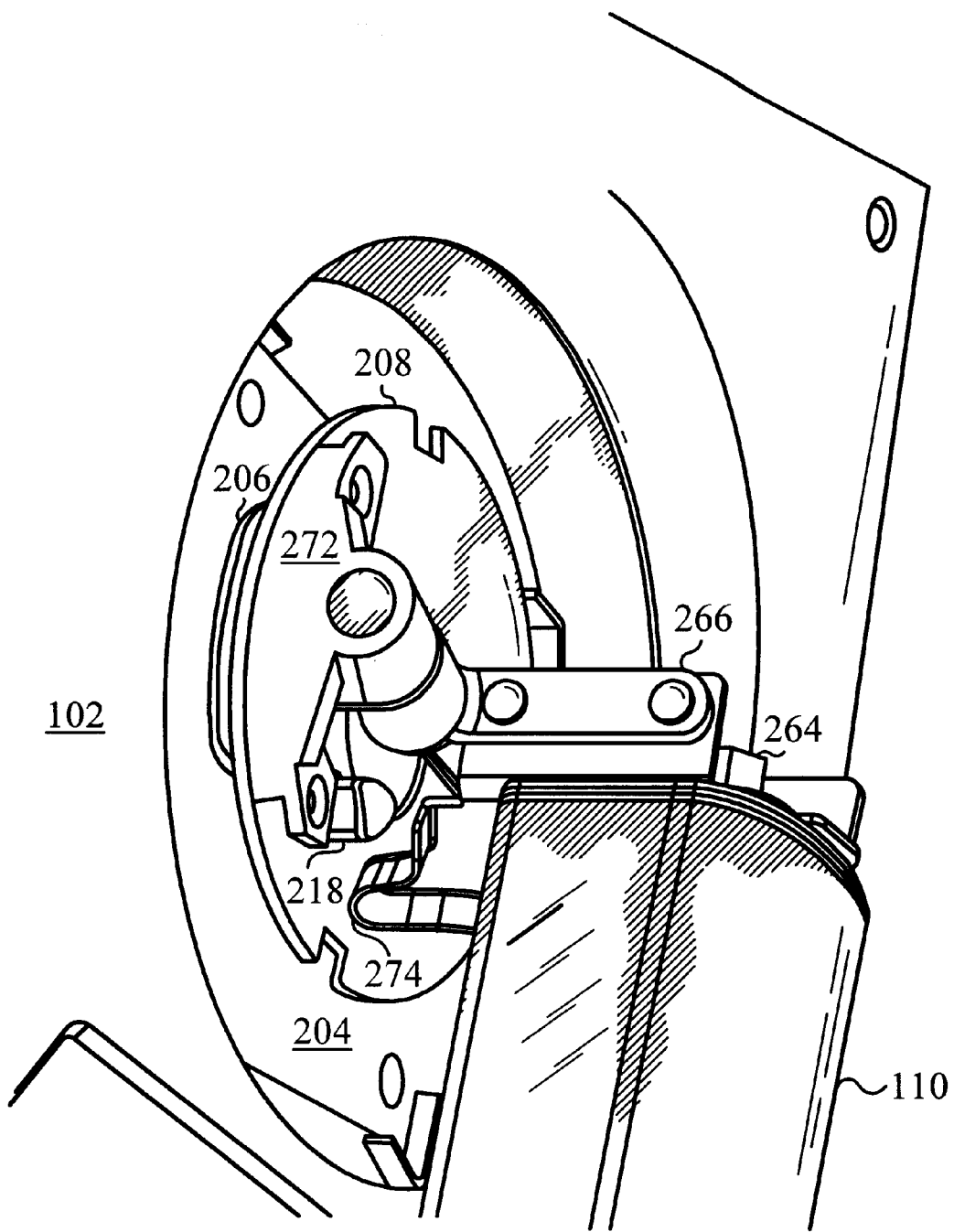
FIG. 4 illustrates a rear perspective view of the tilt and swivel apparatus where the flat panel display is oriented as shown in FIG. 3.

The hinge bracket member 256 is shown partially in FIG. 2b to avoid obscuring other portions of the hinge assembly 250, however, the hinge bracket member 256 is shown more fully in FIG. 4. The tilt bracket 266 is mounted to the hinge bracket member 256, preferably by screws (not shown) and is rotatably coupled to the axle 268. The tilt base 272 is coupled to the axle 268 and is mounted to the pivot plate 208, preferably by screws (not shown). Accordingly, the pivot plate 208 can be tilted with respect to the hinge bracket 256 about an axis centrally disposed within the axle 268. Preferably, the spring 270 and friction between the bracket 256 and the axle 268 support the weight of the display 102 for preventing undesired tilting of the display 102.

It will be apparent that the arrangement of the hinge assembly 250 illustrated in FIG. 2c is illustrative of a presently preferred embodiment the present invention, but is not intended to limit the scope of the claims appended hereto. More particularly, the arrangement of the hinge bracket member 256, the tilt bracket member 266, the spring 270 and the axle 268, can be altered while achieving the principle advantages of the present invention. For example, axle 268 can be fixed with respect to either of the brackets 256 or 266. Alternately, the axle 268 can be omitted. In which case, the axle 268 can be replaced by two shorter axles, each providing a rotational coupling between the bracket members 256, 266. In addition, the spring 268 can be omitted, in which case, the display 102 is supported entirely by friction, or the spring 268 can be replaced by another spring element.

From FIG. 2a it can be seen that the plate 204 is included in a portion of the swivel apparatus 200 which is pivotable with respect to the neck member 108 (FIG. 1), the riser member 110 (FIG. 1) and base 104 (FIG. 1). Further, the plate 208 is included in a portion of the swivel apparatus 200 which is pivotable with respect to the flat panel display 102 (FIG. 1). As explained herein, under certain circumstances, the cam 218 contacts the ramp 274 so as to prevent the display 102 from contacting the base 104 (FIG. 1) when the plate 204 is pivoted with respect to the neck member 108, riser 110 and base 104.

FIG. 3 illustrates a front perspective view of the flat panel display stand 100 in accordance with the present invention where the flat panel display 102 is oriented horizontally (landscape). Thus, as shown in FIG. 3, the display 102 is rectangular and oriented such that its width is greater than its height. It will be apparent, however, that the shape of the display 102 can be altered from the rectangular shape shown in FIG. 3 while achieving advantages of the present invention.

FIG. 4 illustrates a rear perspective view of the tilt and swivel apparatus 200 where the flat panel display 102 is oriented as shown in FIG. 3. As shown in FIG. 4, the cam 218 is on a first side of the ramp 274. The cam 118 and ramp 274 preferably do not contact each other when the display 102 is in the landscape orientation. Accordingly, the user may adjust the tilt of the display 102 by moving the bottom of the display 102 closer or further from the user without interference caused by the cam 218 and ramp 274.

Figure 5:
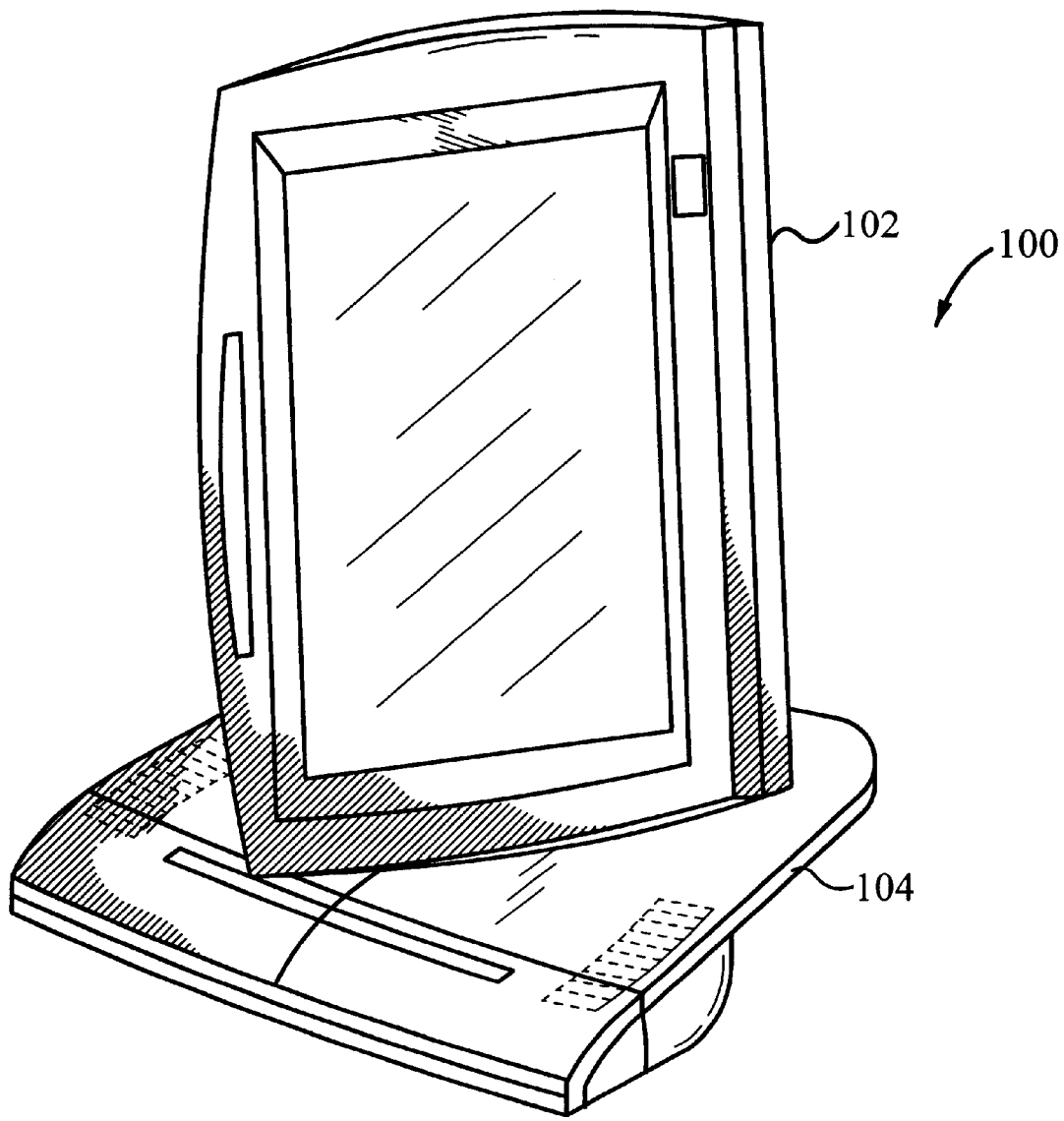
FIG. 5 illustrates a front perspective view of the flat panel display stand in accordance with the present invention where the flat panel display is oriented between a horizontal position and a vertical position.

To change the orientation of the display 102 from the landscape to portrait orientations, the user rotates the display 102 such that the plates 204, 208 (FIG. 2a) pivot with respect to each other. FIG. 5 illustrates a front perspective view of the flat panel display stand 100 in accordance with the present invention where the flat panel display 102 is oriented between the horizontal and vertical positions. As shown in FIG. 5, a lower corner of the display 102 approaches the base 104. In absence of the cam 218 and ramp 274 of the present invention, the display 102 can contact the base 104, possibly causing damage.

Figure 6:
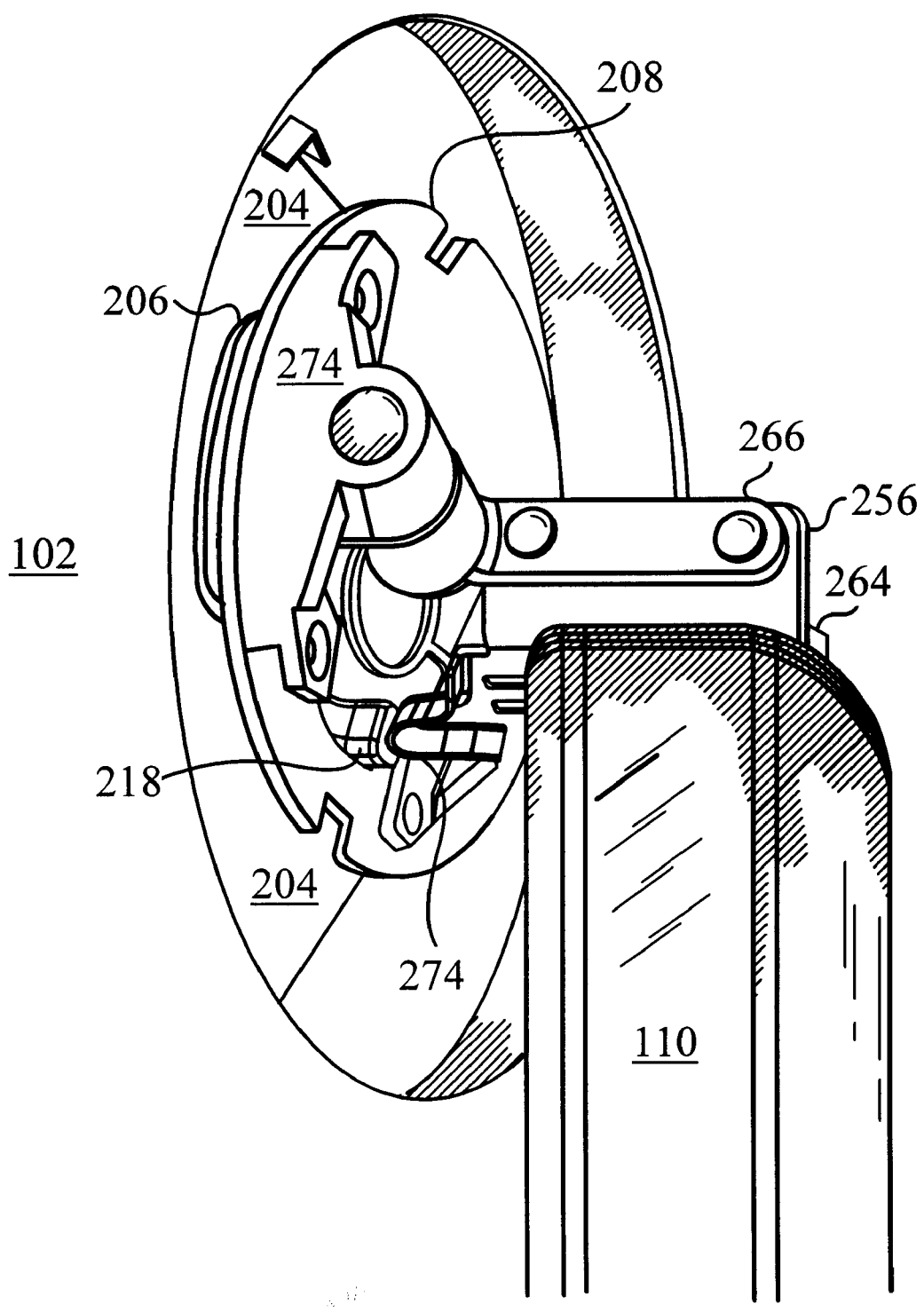
FIG. 6 illustrates a rear perspective view of the tilt and swivel apparatus where the flat panel display is oriented as shown in FIG. 5.

FIG. 6 illustrates a rear perspective view of the tilt and swivel apparatus 200 where the flat panel display is oriented as shown in FIG. 5. As shown in FIG. 6, the cam 218 is aligned with the ramp 274. As a result, contact between the cam 218 and the ramp 274 tilts the display 102 such that the lower portion of the display 102, particularly, the lower corner, is thrust away from the base 104 preventing contact therebetween. In the preferred embodiment, profiles of the cam 218 and ramp 274 are configured such that the lower portion of the display 102 is gradually forced away from the base 104 as the cam 218 and ramp 274 slidably contact each other. Within the scope of the invention, although less preferred, are profiles which abruptly force the lower portion of the display 102 outward as this would tend reduce the ability of the cam 218 and ramp 274 to slide against each other and would tend increase difficultly encountered by the user in pivoting the display 102. In the preferred embodiment, the cam 218 is formed of a metal, such as brass, however, it will be apparent that the cam 218 can be formed of another material, such as plastic. In addition, the bracket 256, including the ramp 274, is formed of steel, however, it will be apparent that the bracket 256 can be formed of another material.

Figure 8:
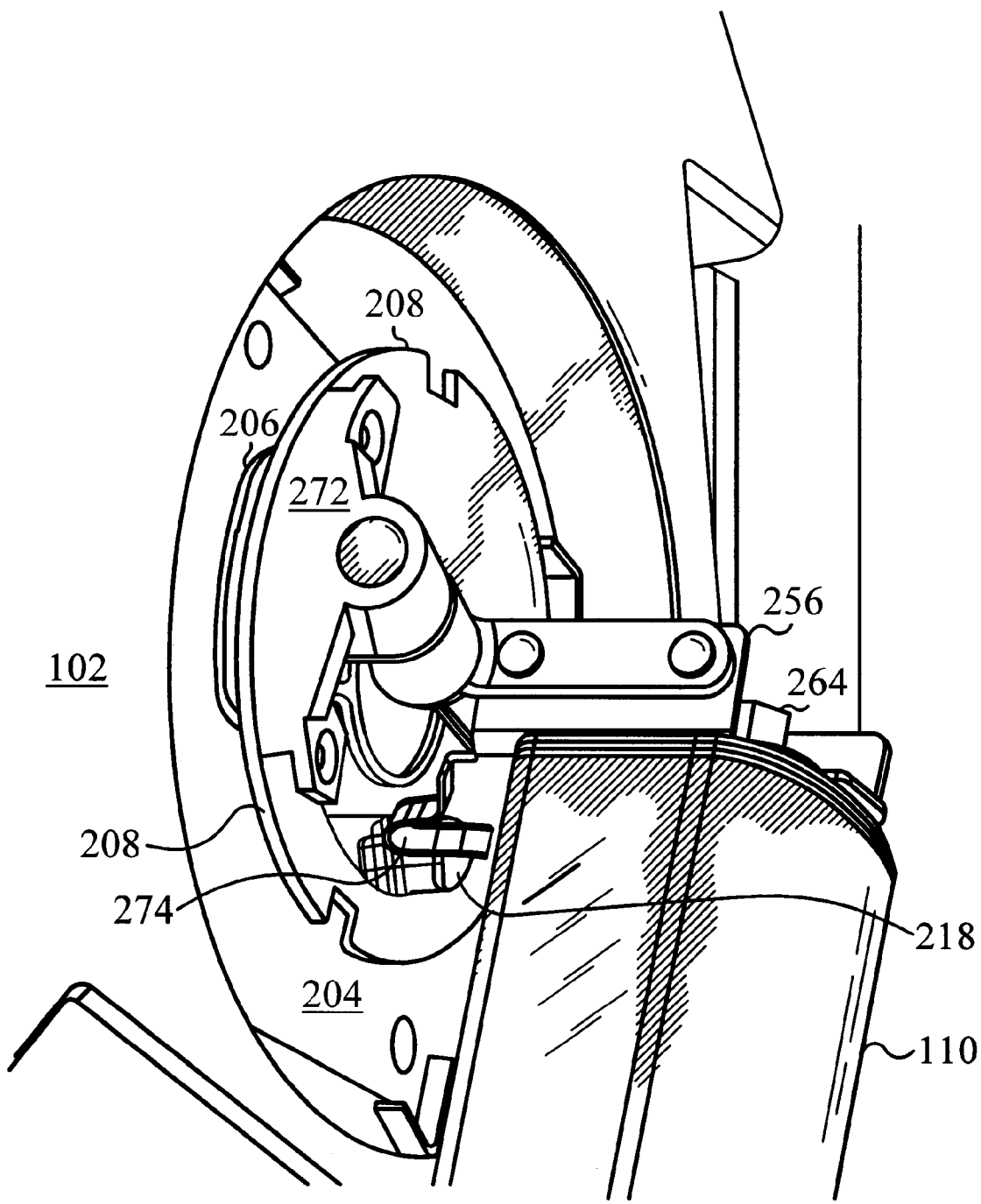
FIG. 8 illustrates a rear perspective view of the tilt and swivel apparatus where the flat panel display is oriented as shown in FIG. 7.

FIG. 7 illustrates a front perspective view of the flat panel display stand 100 in accordance with the present invention where the flat panel display 102 is oriented vertically (portrait). Thus, as shown in FIG. 7, the display 102 is oriented such that its height is greater than its width. FIG. 8 illustrates a rear perspective view of the tilt and swivel apparatus 200 where the flat panel display 102 is oriented as shown in FIG. 7. As shown in FIG. 8, the cam 218 is on a second side of the ramp 274. The cam 218 and ramp 274 preferably do not contact each other when the display 102 is in the portrait orientation. Accordingly, the user may adjust the tilt of the display 102 by moving the bottom of the display 102 closer or further from the user without interference caused by the cam 218 and ramp 274.

Figure 9:
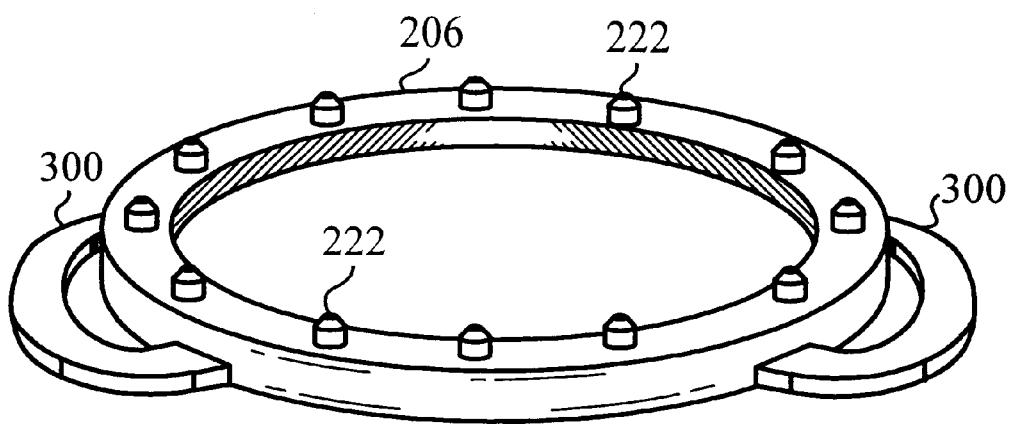
FIG. 9 illustrates a top perspective view of the pivot bearing in accordance with the present invention.
Figure 10:
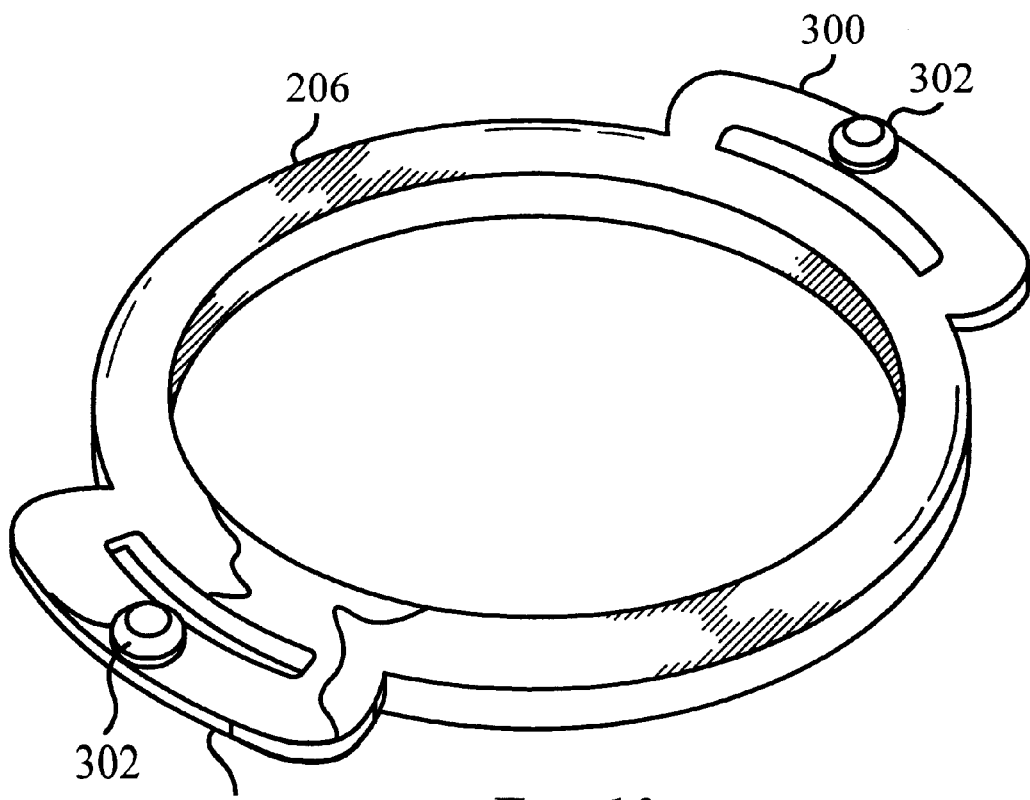
FIG. 10 illustrates a bottom perspective view of the pivot bearing in accordance with the present invention.

FIG. 9 illustrates a top perspective view of the pivot bearing 206 in accordance with the present invention. As shown in FIG. 9, the pivot bearing 206 includes the projections 222 for engaging the apertures 224 in the plate 208, as explained above in reference to FIG. 2a. In addition, the bearing 206 preferably includes a pair of lobes 300. FIG. 10 illustrates a bottom perspective view of the pivot bearing 206 in accordance with the present invention. As shown in FIG. 10, each lobe 300, includes a corresponding projection 302. The projections provide detents for aiding the user is precisely positioning the display 102 in the landscape position, as illustrated in FIG. 3, and in the portrait position, as illustrated in FIG. 7.

Referring to FIG. 2a in conjunction with FIG. 10, the plate 204 includes a pair of apertures 304 for engaging the pair of projections 302 in each of the landscape and portrait positions. Accordingly, four of apertures 304 are preferably provided. When the display 102 is in the landscape orientation, the projections 302 engage two of the four apertures 304 and, when the display 102 is in the portrait orientation, the projections 302 engage the remaining two of the four apertures 304. The apertures 304 are preferably positioned at forty-five degree intervals with respect to the axis of rotation 114 (FIG. 1) of the pivot plates 204, 208. The projections 302 are resiliently urged into the appropriate apertures 304 by the lobes 300, thus, providing detents for each of the landscape and portrait orientations.

In the preferred embodiment, the projections 302 have beveled edges, as illustrated in FIG. 10. In addition, the apertures 304 provide receptacles which are also beveled. When the display 102 is moved from one of the landscape or portrait orientations toward the other, the beveled surfaces of the projections 302 and the apertures 304 cause the lobes 302 to flex such that the projections are no longer urged into the appropriate ones of the apertures 304, but slide along the surface of the pivot plate 204 until the display 102 is pivoted sufficiently that the projections engage the remaining apertures 304. Thus, the lobes 300 are preferably resiliently flexible with respect to the remainder of the bearing member 208. In the preferred embodiment, the pivot bearing 206 is formed of acetal, which is the generic term for a plastic marketed under the name, Delrin®, among others. Although, in the preferred embodiment, two lobes 300 are provided with each lobe 300 having one projection 302, it will be apparent that the advantages of the present invention can be achieved with more or fewer lobes, projections and corresponding numbers of apertures 304. In addition, it will be apparent that the bearing 206 can be fixed with respect to the plate 204 and that the apertures 304 can be provided in the pivot plate 208 for receiving the projections 302, while achieving the principle advantages of the present invention.

From the above, it is apparent that the bearing member 206 provides both a bearing surface and detents for assisting a user in precisely aligning the flat panel display 102 to the portrait and landscape positions.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. For example, it will be apparent that the present invention can be utilized for positional adjustment of an article other than a flat panel display.

What is claimed is:

1. An apparatus for pivot adjustment of an article, the apparatus comprising:
   a. a first pivot plate having first and second receptacles; and
   b. a bearing member in slidable contact with the first pivot plate wherein the bearing member pivots with respect to the first pivot plate and wherein the bearing member includes a projection and wherein the projection mates with the first receptacle when the bearing is in a first orientation with respect to the first pivot plate and wherein the projection mates with the second receptacle when the display is a second orientation with respect to the first pivot plate.

2. The apparatus according to claim 1 wherein the projection is integral to the bearing member.

3. The apparatus according to claim 1 wherein the bearing member includes a resiliently flexible lobe.

4. The apparatus according to claim 3 wherein the projection is integral to the resiliently flexible lobe.

5. The apparatus according to claim 1 further comprising a second pivot plate in contact with the bearing member and having fixed position relative to the bearing member wherein the bearing member is disposed between the first pivot plate and the second pivot plate.

6. The apparatus according to claim 1 further comprising a display monitor coupled to the first pivot plate.

7. The apparatus according to claim 6 wherein the first orientation corresponds to a portrait orientation and wherein the second orientation corresponds to a landscape orientation.

8. An apparatus for pivot adjustment of an article, the apparatus comprising:
   a. a mount for the article; and
   b. a swivel apparatus coupled to the mount wherein a pivotable portion of the swivel apparatus is pivotable with respect to the article and wherein the swivel apparatus includes a bearing member having a bearing surface for slidably coupling the pivotable portion of the swivel apparatus to the article and wherein the bearing member includes one or more projections, wherein at least one of the projections mates with a first corresponding receptacle when the article is in a first orientation with respect to the pivotable portion of the swivel apparatus and wherein at least one of the projections mates with a second corresponding receptacle when the display is a second orientation with respect to the pivotable portion of the swivel apparatus.

9. The apparatus according to claim 8 wherein the projections are integral to the bearing member.

10. The apparatus according to claim 1 wherein the bearing member includes a resiliently flexible lobe.

11. The apparatus according to claim 10 wherein at least one of the projections is integral to the resiliently flexible lobe.

12. The apparatus according to claim 8 wherein the article is a display monitor.

13. The apparatus according to claim 12 wherein the first orientation corresponds to a portrait orientation and wherein the second orientation corresponds to a landscape orientation.

14. An apparatus for pivot adjustment of an article, the apparatus comprising:
   a. a stand for the article; and
   b. a swivel apparatus coupled to the mount wherein a pivotable portion of the swivel apparatus is pivotable with respect to the stand between a first orientation with respect to the stand and a second orientation with respect to the stand wherein the swivel apparatus includes a cam and a corresponding ramp and wherein contact between the cam and ramp when the display is between the first and second orientations causes the article to be tilted with respect to the stand thereby inhibiting contact between the article and the stand.

15. The apparatus according to claim 14 wherein the article is a display monitor.

16. The apparatus according to claim 15 wherein the first orientation corresponds to a portrait orientation and wherein the second orientation corresponds to a landscape orientation.

17. The apparatus according to claim 14 further comprising a stand for the display monitor coupled to the pivotable portion of the apparatus.

18. The apparatus according to claim 14 wherein when the pivotable portion is in the first orientation, the cam member is not in contact with the ramp member.

19. The apparatus according to claim 14 wherein when the pivotable portion is in the second orientation, the cam member is not in contact with the ramp member.

20. The apparatus according to claim 14 wherein when the pivotable portion is in either of the first and second orientations, the pivot member is tiltable with respect to the second axis to a greater degree in comparison to when the pivotable portion is between the first orientation and the second orientation.

21. An apparatus for pivot adjustment of an article, the apparatus comprising:
   a. a pivot member;
   b. a cam member coupled to the first pivot member;
   c. a pivotable portion of the apparatus which is pivotable with respect to the pivot member about a first axis and tiltable with respect to the pivot member about a second axis wherein the pivotable portion includes a ramp member and wherein contact between the cam member and the ramp member when the pivotable portion is between a first and a second orientation with respect to the first axis causes the pivot member to be tilted with respect to the second axis.

22. The apparatus according to claim 21 further comprising a display monitor coupled to the pivot member.

23. The apparatus according to claim 22 wherein the first orientation corresponds to a portrait orientation and wherein the second orientation corresponds to a landscape orientation.

24. The apparatus according to claim 22 further comprising a stand for the display monitor coupled to the pivotable portion of the apparatus.

25. The apparatus according to claim 21 wherein when the pivotable portion is in the first orientation, the cam member is not in contact with the ramp member.

26. The apparatus according to claim 21 wherein when the pivotable portion is in the second orientation, the cam member is not in contact with the ramp member.

27. The apparatus according to claim 21 wherein when the pivotable portion is in either of the first and second orientations, the pivot member is tiltable with respect to the second axis to a greater degree in comparison to when the pivotable portion is between the first orientation and the second orientation.

28. The apparatus according to claim 21 wherein cam member is slidable along the ramp member when the pivotable portion is between a first and second orientations with respect to the first axis.

29. An apparatus for pivot adjustment of an article, the apparatus comprising:
   a. a pivot member having first and second receptacles; and
   b. a bearing member in slidable contact with the pivot member wherein the bearing member pivots with respect to the pivot member about a first axis and wherein the bearing member includes a projection and further wherein the projection mates with the first receptacle when the bearing member is in a first orientation with respect to the pivot member and wherein the projection mates with the second receptacle when the bearing member is a second orientation with respect to the pivot member;
   c. a cam member coupled to the pivot member;
   d. a pivotable portion of the apparatus which is pivotable with respect to the pivot member about the first axis and tiltable with respect to the pivot member about a second axis wherein the pivotable portion includes a ramp member and wherein contact between the cam member and the ramp member when the pivotable portion is between the first and the second orientation causes the pivot member to be tilted with respect to the second axis.

30. The apparatus according to claim 29 wherein the projection is integral to the bearing member.

31. The apparatus according to claim 29 wherein the bearing member includes a resiliently flexible lobe.

32. The apparatus according to claim 31 wherein the projection is integral to the resiliently flexible lobe.

33. The apparatus according to claim 29 further comprising a display monitor coupled to the pivot member.

34. The apparatus according to claim 33 wherein the first orientation corresponds to a portrait orientation and wherein the second orientation corresponds to a landscape orientation.

35. The apparatus according to claim 33 further comprising a stand for the display monitor coupled to the pivotable portion of the apparatus.

36. The apparatus according to claim 29 wherein when the pivotable portion is in the first orientation, the cam member is not in contact with the ramp member.

37. The apparatus according to claim 29 wherein when the pivotable portion is in the second orientation, the cam member is not in contact with the ramp member.

38. The apparatus according to claim 29 wherein when the pivotable portion is in either of the first and second orientations, the pivot member is tiltable with respect to the second axis to a greater degree in comparison to when the pivotable portion is between the first orientation and the second orientation.

39. An apparatus for adjustment of a display monitor, the apparatus comprising:
   a. a first pivot member including means for mounting the display monitor;
   b. a second pivot member coupled to the first pivot member via a bearing member wherein the display monitor is selectively pivotable between portrait and landscape positions with respect to the second pivot member;
   c. a hinge assembly coupled to the second pivot member wherein a tilt of the display monitor is selectively adjustable by rotation of the hinge assembly with respect to the second pivot member; and
   d. a stand coupled to the hinge assembly such that the display is selectively adjustable from side-to-side with respect to the stand.

40. The apparatus according to claim 39 wherein a selected one of the first and second pivot members includes first and second receptacles and wherein the bearing member is in slidable contact with the selected one of the first and second pivot members and wherein the bearing member includes a projection and further wherein the projection mates with the first receptacle when the bearing member is in a first orientation with respect to the selected one of the first and second pivot members and wherein the projection mates with the second receptacle when the bearing member is a second orientation with respect to the selected one of the first and second pivot members.

41. The apparatus according to claim 39 further comprising a cam member coupled to the first pivot member wherein the hinge assembly includes a ramp member and wherein contact between the cam member and the ramp member when the pivotable portion is between the first and the second orientation affects the tilt the display monitor.

* * * * *

UNITED STATES PATENT AND TRADEMARK OFFICE
CERTIFICATE OF CORRECTION

PATENT NO. : 6,189,842 B1
DATED : February 20, 2001
INVENTOR(S) : Bergeron Gull et al.

It is certified that error appears in the above-identified patent and that said Letters Patent is hereby corrected as shown below:

Column 7,
Line 61, (Claim 10, line 1), replace "claim 1" with -- claim 8 --.

Signed and Sealed this

Twenty-fifth Day of September, 2001

Attest:

*Nicholas P. Godici*

NICHOLAS P. GODICI
*Attesting Officer*     *Acting Director of the United States Patent and Trademark Office*